United States Patent [19]
Chen et al.

[11] Patent Number: 5,898,802
[45] Date of Patent: Apr. 27, 1999

[54] COUPLING METHOD AND APPARATUS FOR COUPLING POLYMER FIBERS TO A LIGHT SOURCE FOR IMPROVING POWER HANDLING CAPABILITIES OF THE POLYMER FIBERS

[75] Inventors: Chingfa Chen, West Covina; Douglas M. Brenner, Los Angeles, both of Calif.

[73] Assignee: Cogent Light Technologies, Inc., Santa Clarita, Calif.

[21] Appl. No.: 08/827,092

[22] Filed: Mar. 27, 1997

[51] Int. Cl.$^6$ ............................................. G02B 6/26
[52] U.S. Cl. ................................................. 385/31
[58] Field of Search ........................... 385/27, 28, 31, 385/33; 362/351, 355, 356, 360, 352, 358; 428/902, 287, 351, 360

[56] References Cited

U.S. PATENT DOCUMENTS

| | | |
|---|---|---|
| 4,461,538 | 7/1984 | Breed, III et al. . |
| 4,639,077 | 1/1987 | Dobler . |
| 4,773,723 | 9/1988 | Cuda . |
| 4,944,567 | 7/1990 | Kuper et al. . |
| 5,016,963 | 5/1991 | Pan ........................... 385/138 |
| 5,094,518 | 3/1992 | Musk . |
| 5,109,466 | 4/1992 | Seike et al. . |
| 5,124,900 | 6/1992 | Varey et al. .......................... 362/352 |
| 5,179,610 | 1/1993 | Milburn et al. ........................ 385/137 |
| 5,208,881 | 5/1993 | Bruesselbach ......................... 385/27 |
| 5,274,723 | 12/1993 | Komatsu . |
| 5,450,040 | 9/1995 | Matsui et al. ......................... 331/96 |

FOREIGN PATENT DOCUMENTS

| | | |
|---|---|---|
| 0251623 | 1/1988 | European Pat. Off. . |
| 0361751 | 4/1990 | European Pat. Off. . |
| 0400856 | 12/1990 | European Pat. Off. . |
| 0415625 | 3/1991 | European Pat. Off. . |
| 3744367 | 8/1989 | Germany . |
| 62-10608 | 1/1987 | Japan . |
| 2143207 | 6/1990 | Japan . |
| 9535517 | 12/1995 | WIPO . |
| 9705510 | 2/1997 | WIPO . |

*Primary Examiner*—Akm E. Ullah
*Attorney, Agent, or Firm*—Rothwell, Figg, Ernst & Kurz, P.C.

[57] ABSTRACT

The power handling capability of polymer fibers is increased by broadening an input intensity profile, which is typically Gaussian, without significantly decreasing the efficiency of coupling light into a polymer fiber. The method for increasing the power handling capability of polymer fibers includes the steps of: a) emitting light having a Gaussian intensity profile from a fiber light source; b) broadening the Gaussian intensity profile so that energy at the center of the Gaussian intensity profile is distributed to the perimeter to reduce the peak power intensity of the emitted light before it is launched into the polymer fiber; c) transmitting the emitted light into at least one polymer fiber. Preferably, a fused bundle is used to broaden the intensity profile and preferably the fused bundle has an angled input end face. As a result, more total power can be coupled into the polymer fiber while keeping below the melting threshold caused by the light absorption—enabling, for example, power in excess of 1 Watt to be transmitted through a 1-mm diameter PMMA fiber.

58 Claims, 2 Drawing Sheets

COUPLING METHOD AND APPARATUS FOR COUPLING POLYMER FIBERS TO A LIGHT SOURCE FOR IMPROVING POWER HANDLING CAPABILITIES OF THE POLYMER FIBERS

BACKGROUND OF THE INVENTION

1. Field of the Invention

The present-invention relates to light transmitting fibers such as low melting temperature fibers fabricated from polymers (e.g., polymethyl methacrylate, PMMA, etc.) which have been widely used in light transmission and illumination for industrial and medical applications. More particularly, the present invention relates to the power handling capabilities of such light transmitting fibers.

2. Description of the Background Art

The following description of the background art represents the inventors' knowledge and not necessarily knowledge of those within the art.

Low melting temperature fibers fabricated from polymers have advantages of high numerical apertures, mechanical flexibility, and low cost. Light is normally coupled directly into these fibers from a focused light source or from another fiber or fiber bundle by proximity coupling ("butt coupling").

Due to the low melting temperature of such polymers and their light absorbing properties, the power handling capability of a polymer fiber is relatively low. A critical parameter that restricts the total amount of light capable of being transmitted is the increase in temperature resulting from absorption within the fiber which, though negligibly small, causes "thermal run-away" and melting of the polymer fiber. The causes for the endface of the fiber gradually melting include not only light absorption but also non-transmitted light which is converted into heat as the result of mismatches in size and numerical aperture between the light source and the polymer fiber.

Light absorption is local power intensity—dependent. As a result, the shape of the intensity profile, which is typically Gaussian, is a major determinating factor for the input power at which a polymer fiber melts. In addition, if appropriate light-filtering is not employed to remove UV and IR light, the fibers will discolor and degrade in their transmission abilities. The latter is accelerated by high light intensity and heat generated from non-transmitted light.

Improvements can be achieved by adding a spatial filter between the light source and the polymer fiber. The spatial filter can consist of a heatsink and an aperture placed at the input interface of the polymer fiber and light source, or of a short piece of glass or quartz fiber, having a numerical aperture equal to or smaller than that of the polymer fiber and a length sufficient to remove unguided modes of light. The latter improves the performance in power transmission of a polymer fiber from the 100 mW range to the range of 300 to 400 mW for a 1-mm diameter PMMA fiber, for example. Nevertheless, the low melting temperature of such polymer fibers severely restricts the maximum power able to be coupled into a single polymer fiber or fiber bundle—as compared with a similar glass or quartz core fiber. For larger diameter single fiber typically 3 mm or larger, it is known in the art to interpose a glass fiber bundle between the light source and the polymer fiber. U.S. Pat. No. 4,986,622 (Martinez) teaches the use of a glass fiber bundle to transmit light from a light source to a bundle of plastic polymer fibers. Although it is known that such spatial filters increase the light able to be transmitted through a plastic fiber without degradation, the degree of spatial filtering is limited to eliminating unguided modes without modifying the shape of the Gaussian profile.

Although spatial filtering eliminates unguided modes, the input light has a Gaussian-like intensity profile for which the peak power is highest in the center and lowest at the perimeter of the beam. As a result, the intensity at the center of the end face of the polymer fiber becomes the limiting factor in the power handling capability of the fiber since high peak power above the absorption threshold will cause degradation of the fiber.

SUMMARY OF THE INVENTION

The present invention, increases the power handling capability of polymer fibers by broadening or modifying the Gaussian intensity profile without significantly decreasing the efficiency of coupling light into a polymer fiber. In the preferred embodiment, the overall intensity profile is more uniform and the peak intensity is lower. This allows more total power to be coupled into the polymer fiber without melting the input interface of the polymer fiber. The methods disclosed facilitate significant improvements in power transmission—enabling, for example, power in excess of 1 watt to be transmitted through a 1-mm diameter PMMA fiber.

The present invention provides a new approach involving a device which modifies the light intensity profile so as to raise the threshold input power at which absorption causes thermal run-away. The device broadens the output intensity profile of the light source before it is coupled into the single polymer fiber or fiber bundle. By broadening the intensity profile, the energy at the center of the Gaussian intensity profile is distributed to the perimeter—thereby reducing the peak power intensity. Since absorption depends on the energy per unit area, a decrease in absorbed energy reduces the probability of reaching the temperature threshold at which the polymer will begin to melt. Hence, the accumulated heat is decreased over that which occurs if the Gaussian profile is not modified, thus ensuring the survival of the fiber at a much higher input power. This in turn increases the maximum power that the polymer fibers can transmit without thermal damage.

According to a first aspect of the invention, a method for increasing the power handling capability of polymer fibers, includes the steps of: a) emitting light, filtered to remove wavelengths below about 400 nm and above about 700 nm, and having a Gaussian intensity profile from a fiber light source; b) broadening the Gaussian intensity profile so that energy at the center of the Gaussian intensity profile is distributed to the perimeter of the profile to reduce the peak power intensity of the emitted light before it is launched into the polymer fiber; c) transmitting the emitted light into at least one polymer fiber.

According to a further aspect of the invention, the Gaussian intensity profile is kept such that the total energy launched (i.e., transmitted) into the at least one polymer fiber is substantially unchanged, but the peak power intensity is diminished.

According to another aspect of the invention, the step of broadening the Gaussian intensity profile includes providing a diffuser between the emitted light and the at least one polymer fiber—the diffuser is most preferably a fused fiber bundle.

According to another aspect of the invention, the end face of the fused fiber bundle is at an angle.

A preferred functional attribute of such a broadening device is that for a given power level from a source of light; for example, light from a fiber optic or from an arc lamp, the total energy impinging on the face of the polymer fiber must be unchanged, but the peak power must be diminished. In effect, the transformation that must be effected is one of dispersing light from the center, low angle light, to the perimeter, high angle light, thereby decreasing the local power density at each point in the center of the Gaussian profile.

The above and other advantages, features and aspects of the invention will be more readily perceived from the following description of the preferred embodiments thereof taken together with the accompanying drawings and claims.

BRIEF DESCRIPTION OF THE DRAWINGS

The present invention is illustrated by way of example and not limitation in the accompanying drawings, in which like references indicate like parts, and in which.

DETAILED DESCRIPTION OF THE PREFERRED EMBODIMENTS

Figure 1:
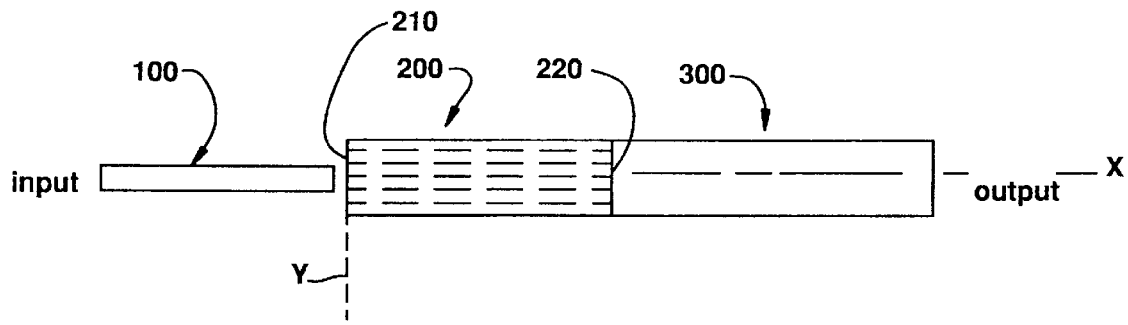
FIG. 1 is a schematic side view of a first embodiment of the invention.

The present invention contemplates that the transformation and broadening of the intensity profile is imparted with diffusers such as holographic gratings, or micro-lens arrays, or concentrating parabolic concentrators, or axicons, or optical wedges. The preferred embodiments of this invention, however, utilize a fused fiber bundle which is designed to operate more as a diffuser than as a light guiding device.

A fused fiber bundle can, for example, have thousands of small diameter fibers, each having a diameter in the range of approximately 10 $\mu$m to 50 $\mu$m. The design of the fused bundle depends on the numerical aperture of the polymer fiber to which light is coupled. The general specification to achieve broadening of the intensity profile and higher light transmission through the polymer fiber depends on the relative numerical apertures of the fused bundle and the polymer fibers and the length of the fused fiber bundle. At the input endface of the fused bundle, each small fiber intercepts a portion of the beam emerging from the source and transmits it to the output end of the bundle. The output profile of the fused bundle is the summation of the output intensity profiles of each individual fiber, which depends on the numerical aperture of each of the individual fibers.

If the fused bundle is shorter than approximately seven (7) times its diameter, light will also be carried in the cladding modes (e.g., un-guided light) to the distal end, further spreading the emitted intensity profile from each fiber. The actual length of the fused bundle relative to its diameter depends on the core cladding ratio and relative numerical apertures. The net effect is to establish a broader Gaussian profile with lower peak intensity at the output endface than it is at the input endface, even if the numerical aperture of the input light is the same as that of the fibers in the fused bundle. Typically, the effective numerical aperture of the fused bundle is chosen to be greater than that of the polymer fiber. The larger the numerical aperture, the flatter the output profile, which in turn, enables the polymer fiber to carry more power without melting than if the source of light is coupled directly. In effect, light is spread from the center to the edges of the Gaussian profile, reducing the absorption threshold, peak power, at which melting occurs. Since the amount of light in the cladding modes is dependent on the length of the fused fiber bundle, the length of the bundle can be adjusted to control the amount of light carried in the cladding modes thereby further diffusing the intensity profile as required. By controlling either the numerical aperture of the fused bundle, the length of the bundle, or both, an optimal output intensity profile is achieved.

Light entering the low melting polymer fiber should be filtered to the extent possible to remove spectral bandwidths of light that are strongly absorbed by the fiber and potentially may cause premature degradation of the light transmitting property of the fiber itself. Typically, these bandwidths include UV (<400 nm) and IR (>700 nm) wavelength regions, but the actual cutoffs depend on the spectral properties of the polymer fiber. For example, with PMMA fiber, light below 410 nm and above 700 nm is filtered in the preferred embodiment of this invention. For the Rohm and Hass Optiflex polyacrylate fiber, the cut-off points are about 430 nm and 700 nm.

Light filtering may be accomplished internally to the light source, at the input of a single light delivering fiber as the light source, or at the interface between the fused bundle and the at least one polymer fiber. Light filtration can be accomplished with dielectric coatings applied to transmissive or reflective surfaces—for example, a mirror designed to collect, condense, and focus light onto the endface of a single fiber optic for transmission of light. The endface of the fused bundle may be dielectrically coated to transmit only wavelengths between 400 nm and 700 nm to minimize damage to the polymer fiber. The actual wavelengths chosen will depend on the absorption characteristics of the polymer fiber. Alternatively, a bandpass filter may be applied to one or both ends of the fused bundle, either to limit the bandwidth of light to minimize damage to the polymer fiber or to control the bandwidth for a specific application of the light itself. For example, if light of a specific bandwidth, 630 nm–690 nm, is required for a particular application such as activation of a drug or chemical, the input and output end faces of the fused bundle may be dielectrically coated with low pass (<690 nm) and high pass (>630 nm) coatings, respectively, to produce the specific bandwidth of light needed. Alternatively, dielectric coatings may be applied to one or both ends of a fiber optic as a light source to produce the filtered light. Similarly, a combination of coatings applied to various optical elements in the configuration for coupling light into a polymer fiber without damaging its light transmitting properties may be used; for example, the reflective surface of a mirror designed to collect, condense, and focus light onto the endface of a single fiber optic and one endface of the fused bundle. If instead of a fused bundle an alternative means for diffusing light is used as described above, dielectric coatings may be applied to these diffusers as well for light filtration.

FIG. 1 shows a first embodiment of the invention, as per the above, having a fused fiber bundle 200 having generally perpendicular end faces 210 and 220.—e.g., polished at zero degrees at each face. As illustrated, a fiber light source 100 directs light into the fiber bundle 200. The fiber bundle 200 then directs the light into the polymeric fiber 300. It is contemplated that the polymeric fiber can comprise a single fiber or a fiber bundle.

Figure 2:
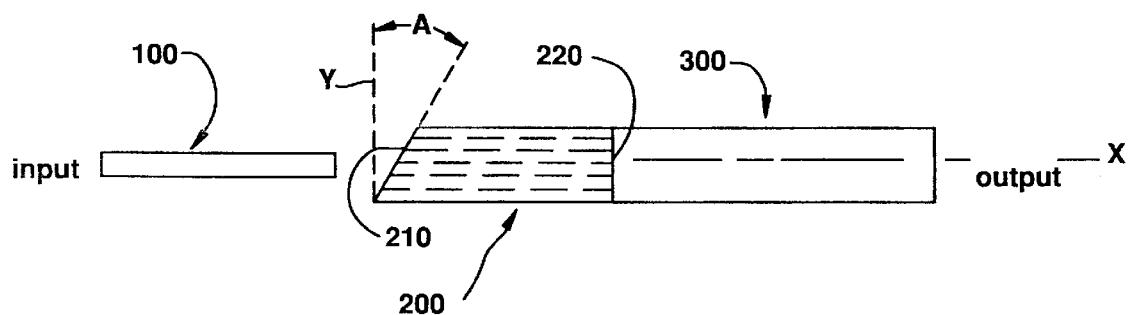
FIG. 2 is a schematic side view of a second embodiment of the invention.

FIG. 2 shows another embodiment wherein the end face 210 is formed at an angle A. In FIG. 2, like numbers indicate like parts. The power handling capability of the polymer fiber(s) 300 is further improved by launching the light into such a fused bundle 200 having its input endface 210 polished at an angle larger than 0 degrees from the vertical line Y. The effect of increasing the input angle is to decrease the effective NA of the fused bundle 200 on the input side, to increase the amount of light carried by cladding modes, and to shift the center of the intensity profile toward the perimeter of the fiber on the output side, thereby creating an asymmetric intensity profile. The resulting asymmetric profile with respect to the axis X of the fused bundle facilitates more efficient use of a heatsink (not shown) to dissipate energy more rapidly before it can accumulate in the fiber.

The present invention contemplates that the polymer fiber 300 for which the input intensity profile is modified can be a single polymer fiber or for a fiber bundle, depending on the characteristics of the light source and the polymer. The input light source 100 can be light from a single fiber, or it can alternately be a focused light source. In addition, as discussed above, the fused bundle 200—which disperses or diffuses the intensity profile—can be substituted with other, although less preferred, devices that provide a similar dispersion—including optical devices for spatial sampling, such as a binary optical device, an integrating optical device, or an appropriately designed incoherent fiber bundle. Finally, in addition to the power handling advantages of the invention for launching light into a polymer fiber, the optical device can also be used to launch high intensity light into polymer fiber bundles and simultaneously reduce the output power variation among fibers in the bundle.

Figure 4:
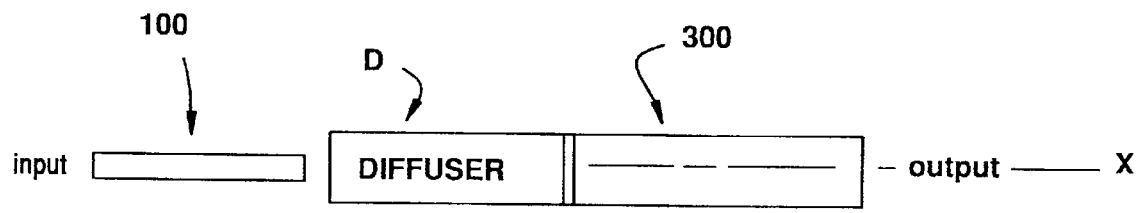
FIG. 4 is a schematic side view illustrating an arrangement of the invention according to a number of embodiments of the invention.

FIG. 4 schematically illustrates embodiments of the invention which include a diffuser D for transforming and broadening the intensity profile. In addition to the fiber bundle diffusers in the preferred embodiments, the diffuser D can involve other diffusers such as holographic gratings, micro-lens arrays, concentrating parabolic concentrators, axicons, or optical wedges. Those skilled in the art would understand how to incorporate such other diffusers based on the present disclosure.

A number of exemplary constructions of the invention are discussed below. Table 1 below applies to a number of such constructions.

TABLE 1

Coupling efficiency and maximum output power vs.
Fused bundle input angle.
Source fiber: 780 μm core dia., 0.68 NA.
Fused fiber bundle: <8 mm long, 1 min dia., 0.57 NA.
Plastic fiber: 41' long, 1 mm dia., 0.5 NA.

| Fused bundle input end face angle (Deg.) | Coupling efficiency between 780 μm fiber and fused bundle (%) | Coupling efficiency between fused bundle and PMMA fiber (%) | Maximum power output without melt (Watt) |
|---|---|---|---|
| 0 | 88 | 48.3 | 590 |
| 15 | 85 | 48 | 860 |
| 20 | 84 | 47.9 | 890 |
| 25 | 77 | 46.4 | 970 |

Table 1 illustrates the coupling efficiency and maximum output power for the same type source fiber, fiber bundle and plastic fiber at different input end face angles.

A first exemplary construction demonstrating one form of the embodiment shown in FIG. 1 is now discussed. In this first example, the input light source is a single quartz fiber with a 0.78 mm diameter, a 0.68 NA, and having a Gaussian output intensity profile. Light therefrom is launched into a short-piece fused glass fiber bundle which is about less than 8 mm long (e.g., about 7 mm), has a 0.57 NA and has thousands of 20 μm diameter fibers. Table 1 includes data pertaining to this type of construction. As shown in Table 1, a measurement of the coupling efficiency at the output endface of the fused bundle confirms the existence of cladding mode because the only observed losses are due to Fresnel loss at each surface. In this first example, the end face of the fused bundle is polished at about zero degrees from the vertical axis Y. The output of the fused bundle is butt-coupled to a PMMA fiber (1-mm diameter, 0.5 NA). As shown in Table 1, this type of construction has a maximum power transmitted through a 4 foot length of plastic fiber of about 600 mW; this is substantially greater than the 300 mW maximum value when such a fused bundle is not present. When the 0.57 NA fused bundle is replaced with a fused bundle having a higher NA of 0.66 NA (where the 0.66 NA bundle still has the same length, the same diameter and the same diameter fibers), the same PMMA fiber is able to transmit a 1.3 Watt optical power without melting. Small changes in the intensity profile promote a substantial difference in the degree to which light can be transmitted through a PMMA fiber without causing degradation.

Figure 5:
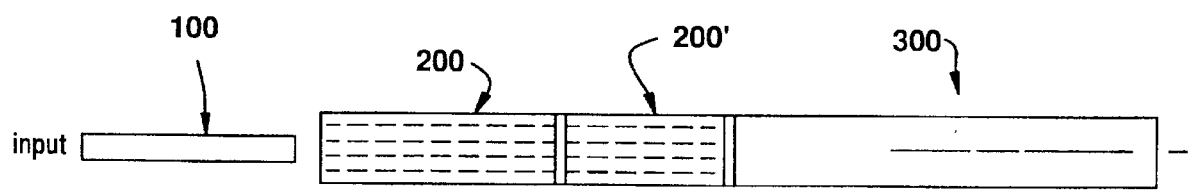
FIG. 5 is a schematic side view illustrating an alternate embodiment of the invention.
Figure 6:
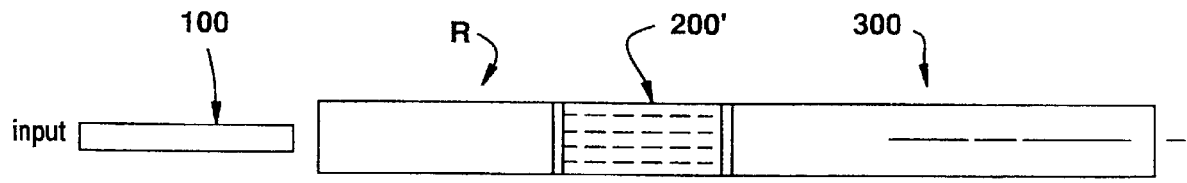
FIG. 6 is a schematic side view illustrating another alternate embodiment of the invention.

An alternative example demonstrating this embodiment is now described. Light from a filtered 300 watt Xenon arc lamp is focused onto the endface of a 3 mm diameter, 0.66 NA fused bundle, which in turn is coupled to a 3 mm diameter polyacrylate single fiber ("Optiflex" manufactured by Rohm and Hass). Up to 4.5 watts of light is coupled into the polymer fiber without degradation of the polymer fiber. By contrast, direct coupling of the filtered Xenon lamp light to the 3 mm polyacrylate single fiber results in melting of the fiber within two (2) minutes. Use of lower NA fused bundles, or 0.66 NA fused bundles of a longer length, similarly reduces the lifetime of the polymer fiber. The broader the intensity profile coupled to the endface of the polymer fiber, the greater the intensity light able to be transmitted through the fiber without degradation. Similarly, use of a second fused bundle of equal or higher NA, having a length less than three (3) times its diameter, as a diffuser in conjunction with a first fused bundle acting as a spatial filter to produce a well defined Gaussian profile, further modifies the input intensity profile to the polymer fiber, thereby minimizing damage to the polymer fiber. Both diffusers are polished normal to their respective optical axes. An example of such a second fused bundle 200' is schematically shown in FIG. 5. Alternatively, a cladded glass rod (an optical cane) can be used in place of the first diffuser to couple light from a source such as a Xenon arc lamp to the fused bundle. An example of such a cladded glass rod R is schematically shown in FIG. 6. As for smaller diameter fibers, a fused bundle interposed between the light source and the polymer fiber performs as a diffuser when its length is less than that required to filter spatially unguided modes. The performance of such a fused bundle diffuser performs optimally when its NA is equal to or greater than that of the polymer fiber.

Figure 3:
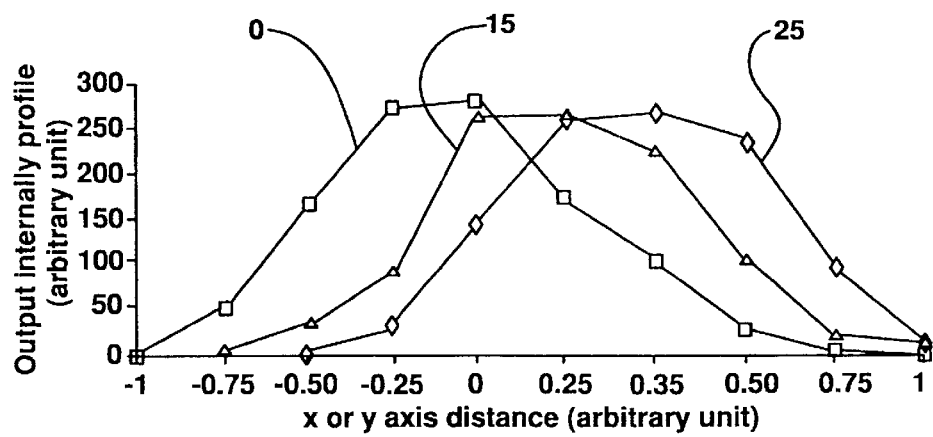
FIG. 3 is a graph of an output intensity profile of an angled input endface fused bundle according to one embodiment of the invention.

A second exemplary construction demonstrating one form of the embodiment shown in FIG. 2 is now discussed. This second example illustrates the sensitivity of the light transmission of a polymer fiber to the input intensity profile and the power density of the light source. As noted, FIG. 2 shows a preferred technique which further increases the power handling capability of the polymer fiber. By launching light into a fused bundle having an angled input endface 210, the output intensity profile is shifted such that the peak of the intensity profile of the light beam is shifted toward an angle greater than 0 degrees from the vertical axis Y. Effectively, light that normally has an angle of incidence of 0 degrees is shifted in its angle of incidence; as a result, light that would normally have a minimum number of internal reflections within the fused bundle is shifted in its angle of incidence resulting in a larger number of internal reflections inside the fiber. Since the peak of the intensity profile occurs at 0 degrees for a Gaussian distribution, an increase in the number of internal reflections broadens the peak of the intensity profile on the output end. By spreading out the peak intensity profile, the peak power is reduced and the peak absorption within the polymer fiber is also reduced. Since this shift in peak intensity creates an asymmetric intensity profile, the center of the distribution is located nearer to the perimeter of the polymer fiber. This shift also enables more effective heatsinking to dissipate the heat more rapidly. FIG. 3 shows the fused bundle output intensity profile (based on structure like that in Table 1) with different angles for the end face 210. Lines 0, 15, and 25 illustrate the intensity profiles with a input end face 210 inclined at 0, 15 and degrees, respectively. The maximum output power of a plastic fiber fused bundle with input angles of 0, 15, 20 and 25 degrees and with a 0.57 NA are listed in Table 1.

The present invention not only increases the maximum power capability of polymer fibers, where the power handling capability of the fiber limits their applications, but can also be used for setting the maximum light output whenever there is a concern for safety or for other reasons. By adjusting the angle of the input endface of the fused bundle; i.e., by controlling the maximum power input of the endface of the polymer fiber, it is possible to set an upper limit on the light intensity incident on the face of the polymer fiber, thereby preventing excess power being delivered through the polymer fiber.

While the present invention has been shown and described with reference to preferred embodiments presently contemplated as best modes for carrying out the invention, it should be understood that various changes may be made in adapting the invention to different embodiments without departing from the broader inventive concepts disclosed herein and comprehended by the claims which follow.

What is claimed is:

1. A method of increasing the power handling capability of polymer fibers, comprising the steps of:
   a) emitting light having an intensity profile with energy higher at a center and lower at a perimeter from a light source;
   b) broadening said intensity profile so that energy at the center of the intensity profile is distributed to the perimeter of the profile to reduce the peak power intensity of the emitted light;
   c) transmitting the broadened light into at least one polymer fiber.

2. The method of claim 1, wherein said step of broadening the intensity profile includes keeping the total energy transmitted into the at least one polymer fiber substantially unchanged, but diminishes peak power intensity.

3. The method of claim 2, wherein said step of broadening the intensity profile includes providing a diffuser between the emitted light and the at least one polymer fiber.

4. The method of claim 3, wherein said step of providing a diffuser involves providing a diffuser selected from the group consisting of a holographic grating, a micro-lens array, a concentrating parabolic concentrator, an axicon, an optical wedge, and a fused fiber bundle.

5. The method of claim 3, wherein said step of providing a diffuser involves providing a fused fiber bundle.

6. The method of claim 5, further comprising the step of filtering the light entering the polymer fiber by applying dielectric coatings to end faces of the fused fiber bundle.

7. The method of claim 5, further including providing said fused fiber bundle with a plurality of small diameter fibers, each fiber having a diameter of about 10 $\mu$m to 50 $\mu$m.

8. The method of claim 5, further including the step of having said fused fiber bundle formed such that light is also carried therein in cladding modes so as to further spread the intensity profile.

9. The method of claim 5, further including the step of providing said bundle with a length that is less than eight times its diameter.

10. The method of claim 5, further including the step of providing a numerical aperture of the fused bundle to greater than that of the at least one polymer fiber.

11. The method of claim 5, further including the step of forming an input end face and an output end face so as to be substantially perpendicular to a center axis of the fused bundle.

12. The method of claim 11, wherein said end faces of the fused bundle are polished at about 90 degrees with respect to said axis.

13. The method of claim 5, further including the step of forming an input end face of the fused bundle at an angle less than 90 degrees from a center axis of the fused bundle.

14. The method of claim 5, further including the step of forming an input end face of the fused bundle at an angle less than 90 degrees from a center axis of the fused bundle and greater than or equal to about 65 degrees from said axis.

15. The method of claim 5, wherein said step of providing said fused bundle includes providing said fused bundle from fused glass fibers.

16. The method of claim 5, wherein said at least one polymer fiber is a single PMMA fiber and further including the step of butt-coupling the output of the fused bundle to the PMMA fiber.

17. The method of claim 16, wherein said PMMA fiber is less than about 1 mm in diameter.

18. The method of claim 16, further including the step of transmitting over 0.5 Watts of optical power without melting the PMMA fiber.

19. The method of claim 5, further including the step of heatsinking light from the perimeter of the fused fiber bundle.

20. The method of claim 1, wherein said step of emitting light includes providing said light source from a single fiber.

21. The method of claim 1, wherein said step of emitting light includes providing said light source from a focused light source.

22. The method of claim 1, wherein said step of transmitting said emitted light into at least one polymer fiber includes providing said at least one polymer fiber as a single polymer fiber.

23. The method of claim 1, wherein said step of transmitting said emitted light into at least one polymer fiber includes providing said at least one polymer fiber as a polymer fiber bundle.

24. The method of claim 1, wherein said step of broadening the intensity profile includes providing a holographic grating between the light source and the at least one polymer fiber.

25. The method of claim 1, wherein said step of broadening the intensity profile includes providing a micro-lens array between the light source and the at least one polymer fiber.

26. The method of claim 1, wherein said step of broadening the intensity profile includes providing a concentrating parabolic concentrator between the light source and the at least one polymer fiber.

27. The method of claim 1, wherein said step of broadening the intensity profile includes providing an axicon between the light source and the at least one polymer fiber.

28. The method of claim 1, wherein said step of broadening the intensity profile includes providing an optical wedge between the light source and the at least one polymer fiber.

29. The method of claim 4, further comprising the step of filtering light entering the at least one polymer fiber.

30. The method of claim 29, wherein said step of filtering includes removing wavelengths of light that are significantly absorbed by the at least one polymer fiber causing degradation of the at least one polymer fiber.

31. The method of claim 29, wherein said step of filtering includes removing wavelengths of light below a predetermined wavelength and removing wavelengths of light above a predetermined wavelength to produce a specific bandwidth of light.

32. The method of claim 29, wherein said step of filtering includes removing wavelengths of light below about 400 nm and above about 700 nm.

33. The method of claim 1, wherein said step of emitting light includes providing light from an arc lamp.

34. The method of claim 33, wherein said arc lamp is coupled to a cladded glass rod or to a fused bundle.

35. A method of increasing the power handling capability of polymer fibers, comprising the steps of:
   a) emitting light having a non-uniform light intensity profile from an light source;
   b) broadening said light intensity profile, while keeping the total energy transmitted substantially unchanged, such that light at a first region of said intensity profile is distributed to a second region of said profile to reduce a peak power intensity of said light;
   c) transmitting said broadened light intensity profile into at least one fiber.

36. The method of claim 35, wherein said at least one fiber is made with a low melting temperature material.

37. The method of claim 36, wherein said at least one fiber is a polymer fiber.

38. A method of transmitting light emitted from a light source, comprising the steps of:
   a) providing a light guide having:
      a diffuser for broadening a light intensity profile received at an input end of the light guide;
      at least one fiber made with a low-melting temperature material connected proximate an output end of the diffuser;
      means for heatsinking light from a perimeter of the diffuser to facilitate removal of excess light converted into heat;
   b) transmitting light from a light source through said light guide so as to broaden the profile of the transmitted light transmitted into said at least one fiber of said light guide.

39. The method of claim 38, wherein said step of providing said diffuser involves providing a fused fiber bundle.

40. The method of claim 38, wherein said step of providing said diffuser involves providing a diffuser selected from the group consisting of a holographic grating, a micro-lens array, a concentrating parabolic concentrator, an axicon, an optical wedge, and a fused fiber bundle.

41. A method of broadening an intensity profile of light emitted from a light source to increase power handling capability when coupled to a polymer fiber, comprising the steps of:
   a) providing a light source coupled to a broadening device for broadening an intensity profile of light emitted from the light source; and
   b) coupling the broadening device to at least one polymer fiber;
   whereby light emitted from the light source passes through the broadening device and is broadened to redistribute light from a center to a perimeter of the light intensity profile prior to transmission of the light into said at least one polymer fiber.

42. The method of claim 41, wherein said broadening device is a fused fiber bundle.

43. The method of claim 41, wherein said broadening device is a diffuser selected from the group consisting of a holographic grating, a micro-lens array, a concentrating parabolic concentrator, an axicon, an optical wedge, and a fused fiber bundle.

44. A method of broadening an intensity profile of light transmitted through a polymer fiber to increase the power handling capability of the polymer fiber when coupled to a light source, comprising the steps of:
   a) providing at least one polymer fiber for receiving transmitted light, said polymer fiber having a light input end and a light output end, said light input end being coupled to a broadening device for broadening a light intensity profile of light transmitted into said at least one polymer fiber;
   b) coupling a light input end of said broadening device to a light source;
   whereby light transmitted through said at least one polymer fiber is initially broadened by the broadening device to redistribute light from a center to a perimeter of the light intensity profile after receipt of the transmitted light from said light source.

45. The method of claim 44, wherein said broadening device is a fused fiber bundle.

46. The method of claim 44, wherein said broadening device is a diffuser selected from the group consisting of a holographic grating, a micro-lens array, a concentrating parabolic concentrator, an axicon, an optical wedge, and a fused fiber bundle.

47. A method of increasing the power handling capability of polymer fibers, comprising the steps of:
   a) emitting light having a non-uniform light intensity profile;
   b) redistributing said intensity profile of said light so as to lower a peak intensity of said profile to reduce the peak power intensity of the emitted light; and
   c) transmitting the broadened light into at least one polymer fiber.

48. The method of claim 47, where said step of redistributing said intensity profile includes transmitting said emitted light through a broadening device.

49. The method of claim 48, wherein said broadening device is a fused fiber bundle.

50. The method of claim 47, wherein said light source is a single fiber.

51. The method of claim 47, wherein said light source is a focused light source.

52. The method of claim 47, wherein during said step of redistributing, said peak power intensity is reduced without changing the total energy of the redistributed light.

53. An apparatus for increasing the power handling capability of polymer fibers, comprising:
   a) light source means for emitting light having a nonuniform light intensity profile;
   b) means for redistributing said intensity profile of said light so as to lower a peak intensity of said profile to reduce the peak power intensity of the emitted light; and
   c) at least one polymer fiber coupled to said means for redistributing said intensity profile of said light.

54. The apparatus of claim 53, wherein said means for redistributing is a fused fiber bundle.

55. The apparatus of claim 54, wherein said fused fiber bundle has an input end face at an angle of less than 90 degrees from a center axis of said fused fiber bundle and greater than or equal to about 65 degrees from said axis.

56. The apparatus of claim 55, wherein said angle is less than 75 degrees from said center axis.

57. An apparatus for increasing the power handling capability of polymer fibers, comprising:
   a) an arc lamp light source for emitting light having a non-uniform light intensity profile;
   b) means, coupled to said arc lamp light source, for redistributing said intensity profile of said light so as to lower a peak intensity of said profile to reduce the peak power intensity of light to emit light having a lower peak intensity for transmission into a polymer fiber to be coupled to said means for redistributing.

58. The apparatus of claim 57, wherein said means for redistributing is a fused fiber bundle coupled to said arc lamp.

* * * * *